UNITED STATES PATENT OFFICE.

ALBERT G. HURLBUTT, OF TROY, ASSIGNOR TO HIMSELF, GEORGE A. WHITTEMORE, OF KEENE, AND HENRY W. FARRAR, OF TROY, N. H.

ABSORBENT COMPOUND FOR THE MANUFACTURE OF TORCHES, FIRE-KINDLERS, &c.

SPECIFICATION forming part of Letters Patent No. 266,477, dated October 24, 1882.

Application filed January 9, 1882. (Specimens.)

*To all whom it may concern:*

Be it known that I, ALBERT G. HURLBUTT, of Troy, of the county of Cheshire and State of New Hampshire, have invented a new and useful Absorbent Compound for the Manufacture of Torches, Fire-Kindlers, &c.; and I do hereby declare the same to be described in the following specification.

The material constituent of my said composition is infusorial earth, more especially that known by the term "infusorial silica," which bears a strong resemblance to common chalk. To twelve parts, by measure, of this infusorial earth I add three parts, by measure, of potters' white clay and five parts, by measure, of soft water. The whole is to be thoroughly kneaded together, and, after having been molded or reduced to the required shape or shapes, should be kiln-dried and next burned to a red or white heat. The composition thus formed will be highly absorbent of kerosene or other inflammable or volatile oil or liquid, and when dipped into it will readily take it up and will retain it for a long period in its normal or inflammable condition.

The composition is specially advantageous for the manufacture of torches, fire-kindlers, railroad signals, fire-works, or various other matters.

I am aware that ordinary clay and sand have been mixed with water and molded and converted into bricks by the process of kiln drying and burning, and therefore I make no claim to such, as a composition so made is not productive of results attainable with one in which, in the place of common sand, a mineral or earthy matter charged with infusoria is used, such infusorial earth being a constituent of my composition, and what on its being burned renders the manufacture so exceedingly absorbent.

I am also aware that a pulverulent fuel has been composed of infusorial silicious earth and a liquid hydrocarbon, such being as described in the United States Patent No. 246,614, all of which differs from my composition, in which potters' clay is used in connection with infusorial earth and with water, the composition being next reduced to a desired shape and kiln-dried and burned to a red or white heat.

I am also aware that infusorial earth has been used as an absorbent of nitro-glycerine, such being described in the United States Patent No. 78,317, such being to form an explosive mixture or compound in a powdered state, all of which differs from my invention, in which the article thereof is not in such a condition, but is in a concrete one, resulting from the addition of the potters' clay to the infusorial earth and water, and subsequently kiln-drying and subjecting the mass to great heat.

I claim as my invention—

The described composition for absorbing a combustible liquid and to serve with such as a torch, fire-kindler, &c., it consisting of infusorial earth and potters' white clay, substantially as set forth.

ALBERT G. HURLBUTT.

Witnesses:
 GEO. A. ADAMS,
 E. P. KIMBALL.